(12) United States Patent
Kiyota et al.

(10) Patent No.: US 11,987,529 B2
(45) Date of Patent: May 21, 2024

(54) LIGHT SHIELDING MEMBER

(71) Applicant: KYOCERA Corporation, Kyoto (JP)

(72) Inventors: Satoshi Kiyota, Higashiomi (JP); Kazuo Watada, Koka (JP); Takehisa Higa, Moriyama (JP); Masamichi Shingu, Shiga (JP); Kunihide Shikata, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 597 days.

(21) Appl. No.: 17/266,032

(22) PCT Filed: Aug. 6, 2019

(86) PCT No.: PCT/JP2019/030931
§ 371 (c)(1),
(2) Date: Feb. 4, 2021

(87) PCT Pub. No.: WO2020/032034
PCT Pub. Date: Feb. 13, 2020

(65) Prior Publication Data
US 2021/0292239 A1 Sep. 23, 2021

(30) Foreign Application Priority Data
Aug. 8, 2018 (JP) ................. 2018-149442

(51) Int. Cl.
*C04B 35/10* (2006.01)
*G02B 5/00* (2006.01)
(Continued)

(52) U.S. Cl.
CPC .............. *C04B 35/10* (2013.01); *G02B 5/003* (2013.01); *C04B 2235/3217* (2013.01);
(Continued)

(58) Field of Classification Search
CPC ............ C04B 35/10; C04B 2235/3217; C04B 2235/3237; C04B 2235/3241; C04B 2235/3262; C04B 2235/3272; C04B 2235/3275; C04B 2235/3279; C04B 2235/9661; G02B 5/003; F21S 41/40; G01J 5/06; G01J 2005/065
See application file for complete search history.

(56) References Cited

U.S. PATENT DOCUMENTS 5,619,099 A   4/1997   Nakamura et al.

FOREIGN PATENT DOCUMENTS

| CN | 101265106 A | 9/2008 |
|---|---|---|
| JP | S49-30408 | 3/1974 |

(Continued)

OTHER PUBLICATIONS

JP2006182595A machine translation (Year: 2006).*

*Primary Examiner* — Bryan D. Ripa
*Assistant Examiner* — Cameron K Miller
(74) *Attorney, Agent, or Firm* — Procopio, Cory, Hargreaves & Savitch LLP

(57) ABSTRACT

The light shielding member of the present disclosure includes an aluminum oxide ceramics including an oxide of titanium whose composition formula is shown as $TiO_{2-x}$ ($1 \leq x < 2$), and a total content of Fe, Ni, Co, Mn and Cr is 260 mass ppm or less.

3 Claims, 5 Drawing Sheets

(51) Int. Cl.
*F21S 41/40* (2018.01)
*G01J 5/06* (2022.01)

(52) U.S. Cl.
CPC ............... *C04B 2235/3237* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/9661* (2013.01); *F21S 41/40* (2018.01); *G01J 5/06* (2013.01); *G01J 2005/065* (2013.01)

(56) References Cited

FOREIGN PATENT DOCUMENTS

| | | | |
|---|---|---|---|
| JP | S51-113197 | | 10/1976 |
| JP | H3-113842 | A | 5/1991 |
| JP | H4-93878 | A | 8/1992 |
| JP | H7-12650 | A | 1/1995 |
| JP | H8-17388 | A | 1/1996 |
| JP | 2002-263606 | A | 9/2002 |
| JP | 2003-264107 | A | 9/2003 |
| JP | 2006-182595 | A | 7/2006 |
| JP | 2006182595 | A * | 7/2006 |
| JP | 2010-67629 | A | 3/2010 |
| JP | 2014-80362 | A | 5/2014 |
| JP | 2018-142462 | A | 9/2018 |
| WO | 2013/008651 | A1 | 1/2013 |
| WO | 2016/196709 | A1 | 12/2016 |

\* cited by examiner

LIGHT SHIELDING MEMBER

TECHNICAL FIELD

The present disclosure relates to a light shielding member.

BACKGROUND

Patent Document 1 describes $Al_2O_3$, Si, Ti, Mn, Fe, Cr and the like as an example of a composition of a black ceramics, and Fe, Cr, Co, Mn, Ni, Cu and the like as a coloring material for making the ceramics black.

PRIOR ART DOCUMENTS

Patent Documents

[Patent Document 1] Japanese Patent Unexamined Publication No. H8-17388

SUMMARY

The light shielding member of the present disclosure includes an aluminum oxide ceramics including an oxide of titanium whose composition formula is shown as $TiO_{2-x}$ ($1 \leq x < 2$), and a total content of Fe, Ni, Co, Mn and Cr is 260 mass ppm or less.

EMBODIMENTS

<Light Shielding Member>

Figure 1:
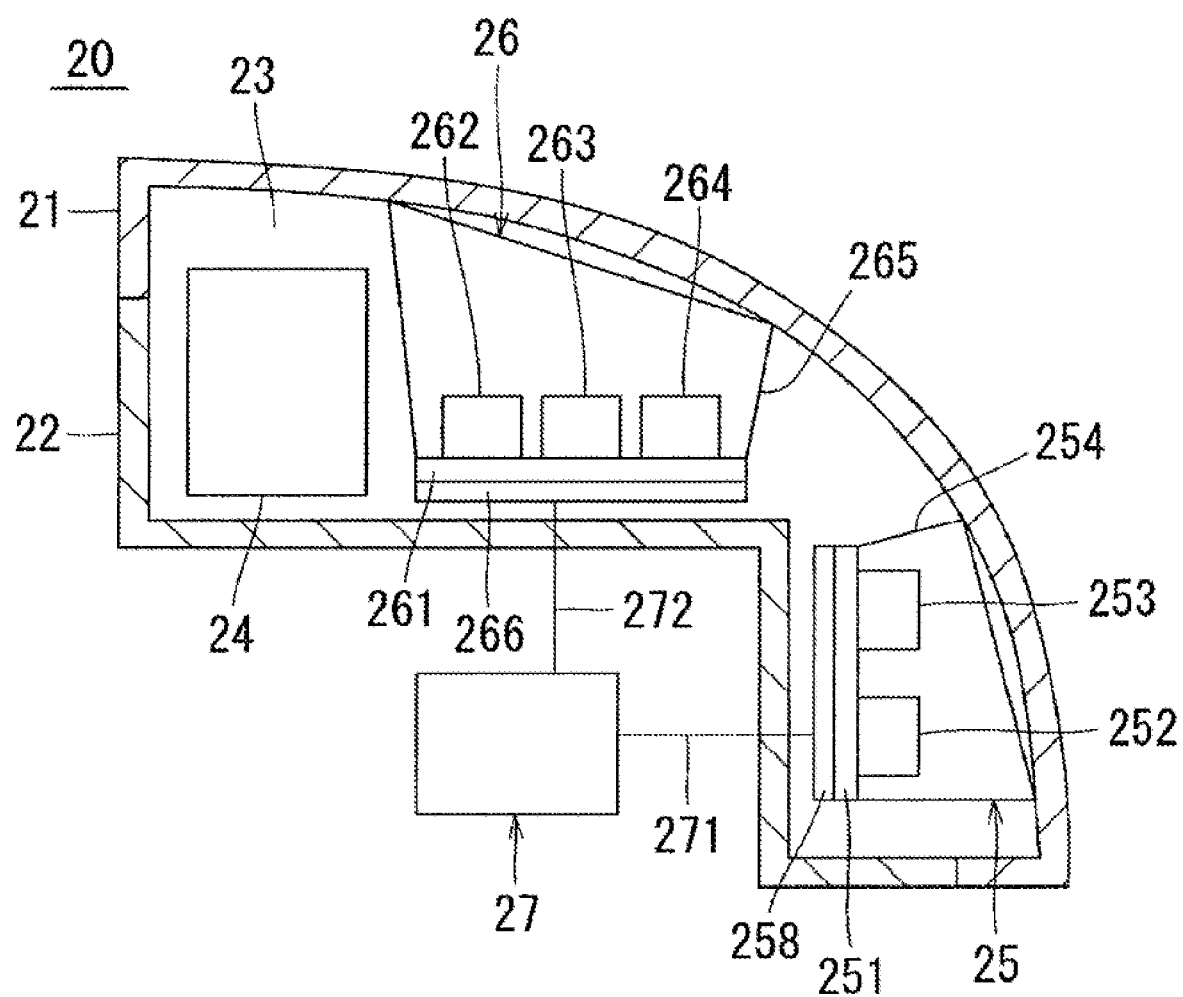
FIG. 1 is a schematic view showing a constitution of a lamp device including the light shielding member according to the embodiment of the present disclosure, which is mounted on the right front of a vehicle.

Hereinafter, the light shielding member according to the embodiment of the present disclosure will be described in detail.

The light shielding member of the present embodiment includes an aluminum oxide ceramics including an oxide of titanium whose composition formula is shown as $TiO_{2-x}$ ($1 \leq x < 2$), and the total content of Fe, Ni, Co, Mn and Cr is 260 mass ppm or less. With such a constitution, a reflectance becomes low over a wide wavelength range. Additionally, deterioration due to sunlight can be suppressed by an ultraviolet (UV) absorption effect of the oxide of titanium, and peripheral members of the light shielding member can be protected, so a long-term use becomes possible. Furthermore, if it is exposed to sunlight, a photocatalytic effect of the oxide of titanium is exhibited, dirt on the peripheral members of the light shielding member can be removed, and an antifouling effect can be also obtained, so a long-term use becomes possible. Hereinafter, the constitution of the light shielding member of the present embodiment will be specifically described.

The aluminum oxide ceramics is a ceramics in which a content of aluminum oxide in which Al is converted to $Al_2O_3$ is 90% by mass or more in 100% by mass of all the components constituting the ceramics. Additionally, the oxide of titanium whose composition formula is shown as $TiO_{2-x}$ ($1 \leq x < 2$) is the one titanium oxide ($TiO_2$) is reduced. A crystal phase of the oxide of titanium may be a rutile-type titanium oxide. Furthermore, the total content of Fe, Ni, Co, Mn and Cr may be 170 mass ppm or less.

The light shielding member of the present embodiment exhibits a black color having a sufficiently low reflectance for light in a relatively wide wavelength range. Specifically, in a CIE1976L*a*b* color space, a lightness index L* is 48 or less, and chromaticity indexes a* and b* are −2 or more and 5 or less, and −10 or more and 0 or less, respectively. The values of the lightness index L* and the values of the chromaticity indexes a* and b* in the CIE1976L*a*b* color space can be obtained in accordance with JIS Z 8722: 2009. For example, a spectrophotometric color difference meter (NF777 or its successor model manufactured by Nippon Denshoku Industries Co., Ltd.) may be used, and as a measuring condition, a light source may be set to the CIE standard light source D65 and a viewing angle may be set to 2°.

In the light shielding member of the present embodiment, a maximum value Rmax of the reflectance over a wavelength of 250 nm to 2500 nm is 24% or less, and ΔR, which is the difference between the maximum value Rmax and a minimum value Rmin, is 15.3% or less. That is, the light shielding member of the present embodiment has a low reflectance in the wavelength range of 250 nm to 2500 nm, and a variation in a wavelength distribution of a light intensity of the reflected light with respect to the irradiation light is small. The light shielding member of the present embodiment has a uniformly low reflectance over such a wide wavelength range.

In the light shielding member of the present embodiment, a content of the oxide of titanium whose composition formula is shown as $TiO_{2-x}$ ($1 \leq x < 2$) is, for example, 0.5% by mass or more and 4% by mass or less in 100% by mass of all the components constituting the ceramics. If the content of the oxide of titanium is in the above-mentioned range, it is possible to obtain a black color having a sufficiently suppressed saturation and a low reflectance, as well as an electrical insulation with a volume resistivity of $10^9$ Ω·m or more at a room temperature (5 to 35° C.). Furthermore, from the viewpoint of further improving the insulating property, the volume resistivity of the light shielding member of the present embodiment may be, for example, $10^8$ Ω·m or more at 200° C. Normally, the volume resistivity decreases as the temperature increases, but the light shielding member of the present embodiment has the insulating property even at a high temperature of 200° C. Here, the volume resistivity can be obtained in accordance with JIS C 2141: 1992. An upper limit of the volume resistivity is not particularly limited.

If the content of the oxide of titanium in the aluminum oxide ceramics forming the light shielding member is 0.5% by mass or more, this aluminum oxide ceramics is inexpensive, and it is possible to obtain a high dielectric constant equivalent to that of a high-purity and expensive aluminum oxide ceramics containing a content of a titanium oxide of less than 0.5% by mass.

The light shielding member may not include aluminum titanate. If such a constitution is satisfied, aluminum titanate having a large difference in a linear expansion coefficient with respect to aluminum oxide does not exist in the light shielding member, so that minute cracks are less likely to occur even if the temperature is repeatedly increased and cooled. In order to check whether the light shielding member contains aluminum titanate, an X-ray chart obtained by using an X-ray diffractometer (XRD) can be collated with a JCPDS card (No. 00-041-0258).

The light shielding member of the present embodiment has the total content of Fe, Ni, Co, Mn, and Cr of 260 mass ppm or less, that is, a content of Cr alone is 260 mass ppm at the maximum. If Cr is included in an alumina, the reflectance of the light in a region having a wavelength of 700 nm or more and less than 780 nm (hereinafter, also referred to as short wavelength region light) or the light in a region having a wavelength of 780 nm or more and less than 1590 nm (hereinafter, also referred to as long wavelength region light) tends to increase, but the light shielding member of the present embodiment has a low reflectance in the short wavelength region and the long wavelength region since the content of Cr is low.

If the content of Cr in the light shielding member is 40 mass ppm or less, the reflectance to the light in a relatively wide wavelength range becomes sufficiently low.

If the content of Fe in the light shielding member is 100 mass ppm or less, the increase in the reflectance due to a discoloration can be further suppressed, so the reflectance in the visible light region and the (near) infrared region becomes lower.

If the content of Ni is 10 mass ppm or less, the content of Co is 5 mass ppm or less, or the content of Mn is 100 mass ppm or less in the light shielding member, changes in a mechanical strength and an electric characteristic become small.

The light shielding member may include oxides of silicon, calcium, and magnesium in the grain boundary phase that bonds the crystal particles of the aluminum oxide to each other. Here, the total content of the oxides of silicon, calcium and magnesium is, for example, 2% by mass or more and 4% by mass or less in 100% by mass of all the components constituting the ceramics. Furthermore, if the total content of the oxides of silicon, calcium and magnesium is set as 100% by mass, the contents of the oxide of calcium and the oxide of magnesium are 10% by mass or more and 30% by mass or less, respectively, and the rest may be the oxide of silicon. If the content of the oxides of silicon, calcium and magnesium is in the above range, the light shielding member has the volume resistivity of $10^{11}$ Ω·m or more, or $10^{12}$ Ω·m or more at the room temperature.

The crystal phase of the oxide of titanium in the light shielding member can be identified by XRD, and the value of x can be determined by using a transmission electron microscope (TEM).

Additionally, the content of aluminum, silicon, calcium, magnesium and titanium converted into the oxide, respectively, can be determined by using an X-ray fluorescence analyzer (XRF) or an ICP (inductively coupled plasma) emission spectrometric apparatus (ICP) to determine the content of each element, and converting them into $Al_2O_3$, $Si_2$, CaO, MgO and $TiO_{2-x}$ ($1 \leq x < 2$), respectively. The contents of Fe, Ni, Co, Mn and Cr may be determined by using a glow discharge mass spectrometer (GDMS).

The light shielding member of the present embodiment may include a portion in which an average value of a skewness Rsk is 0.04 or more and 0.45 or less. If the light shielding member includes such portion, the reflectance becomes low. All the average values of the skewness Rsk in the light shielding member may be 0.04 or more and 0.45 or less.

Additionally, the light shielding member of the present embodiment may include a portion in which an average value of a kurtosis Rku is 4.1 or more and 6.5 or less. If the light shielding member includes such portion, the reflectance becomes low. All the average values of the kurtosis Rku in the light shielding member may be 4.1 or more and 6.5 or less.

Furthermore, the light shielding member of the present embodiment may include a portion in which an average value of an arithmetic mean roughness Ra is 1 μm or more and 2 μm or less. If the light shielding member includes such portion, the reflectance becomes low. All the average values of the arithmetic mean roughness Ra in the light shielding member may be 1 μm or more and 2 μm or less.

The skewness Rsk, the kurtosis Rku, and the arithmetic mean roughness Ra are in accordance with JIS B 0601: 2001, and can be determined by using, for example, a laser microscope ((VK-9510) manufactured by KEYENCE CORPORATION). Measurement conditions are as follows: a measurement mode is a color ultra-depth, a measurement magnification is 400 times, a measurement range is 698 μm×522 μm, a measurement pitch is 0.05 μm, a λs contour curve filter is 2.5 μm, and a λc contour curve filter is 0.08 mm, and the average values of the measured values obtained from 8 points in the above measurement range may be the average values of the skewness Rsk, the kurtosis Rku, and the arithmetic mean roughness Ra, respectively.

The aluminum oxide ceramics includes a light shielding surface, and a color difference Δ*Eab in the CIE1976L*a*b*color space of the light shielding surface may be 4.5 or less.

The color difference Δ*Eab is an index showing a variation in a color tone, and it is represented by the following formula (1).

$$\Delta E^*ab=[(\Delta L^*)^2+(\Delta a^*)^2+(\Delta b^*)^2]^{1/2} \quad (1)$$

(ΔL* is the difference between a lightness index $L_1^*$ of the first point to be measured and a lightness index $L_2^*$ of the second point to be measured on the light shielding surface, Δa* is the difference between a chromaticity index $a_1^*$ of the first point to be measured and a lightness index a2* of the second point to be measured on the light shielding surface, and Δb* is the difference between a chromaticity index $b_1^*$ of the first point to be measured and a lightness index $b_2^*$ of the second point to be measured on the light shielding surface.)

If the color difference Δ*Eab is in the above range, the variation in the color tone of the light shielding surface is reduced, and the variation is hardly visible, so that the commercial value is improved.

Furthermore, the coefficient of variation of the lightness index L* in the CIE1976L*a*b* color space of the light shielding surface of the aluminum oxide ceramics may be 0.02 or less (excluding 0).

If the coefficient of variation of the lightness index L* is in the above range, the light shielding surface is not easily discolored even if it is repeatedly exposed to the light, so it is hardly changed with time. Here, the average value of the lightness index L* of the light shielding surface is, for example, 48 or less.

The values of the lightness index L* and the chromaticity indexes a* and b* in the CIE1976 L*a*b* color space of the light shielding surface can be obtained by the same method as described above.

Additionally, the aluminum oxide ceramics may include open pores, and a skewness of an equivalent circle diameter of the open pores may be 0.1 or more.

If the skewness of the equivalent circle diameter of the open pores is in the above range, the distribution of the equivalent circle diameter moves in a smaller direction, and it becomes difficult for floating metal powder or white light-colored powder to penetrate the open pores, and thus the variation in the color tone of the light shielding surface is reduced and the commercial value is improved.

The average value of the equivalent circle diameter of the open pores is, for example, 4 μm or more and 6 μm or less. A porosity of the open pores is 3 area % or more and 6 area % or less.

In order to obtain the equivalent circle diameter and the porosity of the open pores, a holding member is polished on a surface plate made of cast iron by using diamond abrasive grains having an average particle diameter $D_{50}$ of 3 μm first, and then it is polished on a tin surface plate by using the average particle diameter $D_{50}$ of 0.5 μm to obtain a measuring surface.

Then, using an optical microscope, the magnification is set to be 100 times, and an average portion of the measuring surface is selected and photographed with a CCD camera. Subsequently, by selecting 4 points having a range of an area of $2.27 \times 10^2$ μm per range from the photographed images, and analyzing them by using an image analysis software (for example, Win ROOF manufactured by Mitani Shoji Co., Ltd.), the equivalent circle diameter and the porosity of the open pores can be obtained. In the analysis, the threshold value of the equivalent circle diameter of the open pores is set to be 0.8 μm, and the equivalent circle diameters less than 0.8 μm are not included in the analysis.

The skewness of the equivalent circle diameter of the open pores may be obtained by using the function SKEW provided in Excel (registered trademark, Microsoft Corporation).

Examples of the shape of the light shielding member include a plate shape (light shielding plate). The shape of the light shielding member is not limited to the shapes shown in the examples.

(Method for Manufacturing Light Shielding Member)

Next, an example of the method for manufacturing the light shielding member of the present embodiment will be described.

First, each powder of aluminum oxide, silicon oxide, calcium carbonate, magnesium hydroxide and titanium oxide is prepared.

The total content of the powders of calcium carbonate, magnesium hydroxide and silicon oxide is, for example, 6.5% by mass or more and 12.9% by mass or less out of 100% by mass total of the above powders. As to the contents of the powders of calcium carbonate, magnesium hydroxide and silicon oxide, out of 100% by mass total of these powders, the content of the powder of calcium carbonate is 17.8% by mass or more and 53.4% by mass or less, the content of the powder of magnesium hydroxide is 14.4% by mass or more and 43.2% by mass or less, and the rest is the powder of silicon oxide.

The content of the powder of titanium oxide is, for example, 0.5% by mass or more and 4% by mass or less out of 100% by mass total of the powders of aluminum oxide, silicon oxide, calcium carbonate, magnesium hydroxide and titanium oxide, and the rest is the powder of aluminum oxide.

In particular, the content of magnesium hydroxide is preferably 30% by mass or more and 44% by mass or less of the content of titanium oxide. If the content of magnesium hydroxide is in the above range, generation of anorthite and mullite, which is likely to occur in a reduction treatment described later, is suppressed. Since the anorthite and the mullite have different mean linear expansion coefficient with respect to aluminum oxide, if the generation of these compounds is suppressed, cracks are less likely to occur even if the light shielding member is used in an environment where it is repeatedly exposed to heating and cooling.

Then, these powders are wet mixed and ground by a grinder such as a barrel mill, a rotary mill, a vibration mill, a bead mill, an agitator mill, an atomizer, or an attritor to obtain a slurry. In the above grinding process, a solvent, an organic binder such as polyvinyl alcohol (PVA) of 1 part by mass or more and 1.5 parts by mass or less with respect to 100 parts by mass of the solvent, and a dispersant of 0.1 parts by mass or more and 0.5 parts by mass or less with respect to 100 parts by mass of the solvent are put into the grinder together. Subsequently, the obtained slurry is demagnetized and then spray-dried to obtain granules. By the demagnetization treatment, Fe, Ni and Co which are ferromagnetic metals are removed.

The contents of Fe, Ni, Co, Mn and Cr in the light shielding member are affected by wear of stainless steel members used in the grinder. The stainless steel members that wear out due to a long-term use can, for example, be replaced with titanium parts that easily form a passive film on the surface, or the surface of the stainless steel members can be coated with a titanium-based film such as TiN, TiCN, TiC, TiAlN, TiAlCN, TiAlO and the like, or an amorphous hard carbon (DLC). By replacing or coating the stainless steel member in addition to the demagnetization treatment, the light shielding member having the total content of Fe, Ni, Co, Mn and Cr of 260 mass ppm or less can be obtained.

The granules are molded by a dry pressure molding method or a cold isotropic pressure method (CIP) and then cut to obtain a molded body. Here, in order to obtain the light shielding member having the skewness of the mean pore diameter of the open pores of 0.1 or more, a molding pressure may be, for example, 1500 MPa or more and 4000 MPa or less. Thereafter, a sintered body can be obtained by sintering the obtained molded body in an air (oxidizing) atmosphere at a temperature of 1500° C. or more and 1700° C. or less for a predetermined time.

After sintering, a grinding process may be performed. If necessary, polishing may also be performed by adjusting a polishing material, frequency and polishing time using a vibration barrel polishing machine to obtain a predetermined surface property.

Then, the sintered body obtained by the above-mentioned method is held in a reducing atmosphere, for example, in a mixed gas having a nitrogen:hydrogen ratio of 87 to 90% by volume:10 to 13% by volume, at a temperature of 1300° C. or more and 1400° C. or less for 1 hour or more and 2 hours or less (the reduction treatment) to obtain the light shielding member of the present embodiment.

In order to obtain the light shielding member having the color difference $\Delta*Eab$ of 4.5 or less in the CIE1976L*a*b* color space of the light shielding surface, the content of the powder of titanium oxide is set to be 1.8% by mass or more and 3% by mass or less out of 100% by mass total of the powders of aluminum oxide, silicon oxide, calcium carbonate, magnesium hydroxide, and titanium oxide, and may be held at a temperature of 1330° C. or more and 1400° C. or less for 1 hour or more and 2 hours or less.

In order to obtain the light shielding member in which the coefficient of variation of the lightness index L* in the CIE1976L*a*b* color space of the light shielding surface is 0.02 or less (excluding 0), the content of the powder of titanium oxide is set to be 1.8% by mass or more and 3% by mass or less out of 100% by mass of total of the powders of aluminum oxide, silicon oxide, calcium carbonate, magnesium hydroxide and titanium oxide, and may be held at a temperature of 1350° C. or more and 1400° C. or less for 1 hour or more and 2 hours or less.

The light shielding member of the present embodiment described above has a low reflectance in the visible light region and the (near) infrared region, and moreover it can be used for a long period of time, so it can be used for, for example, an in-vehicle optical device.

<In-Vehicle Optical Device>

Next, as examples of the in-vehicle optical device including the light shielding member of the present embodiment, a lamp device and a head-up display are exemplified and described in order with reference to the drawings. However, each drawing referred to below is shown by simplifying only the constitution necessary for explaining the embodiment for convenience of explanation. Therefore, the in-vehicle optical device of the present disclosure may include any constitution not shown in the referenced drawing. Additionally, the dimensions of the constitutions in the drawings do not faithfully represent the actual dimensions, dimensional ratios, and the like of the constitutions.

(Lamp Device)

In the following description, a constitution in which the lamp device is mounted on the right front of the vehicle will be described as an example, but the lamp device of the present disclosure is not limited to a constitution in which the lamp device is mounted on the right front of the vehicle as long as it performs its functions.

As shown in FIG. 1, the lamp device 20 according to the embodiment of the present disclosure includes a translucent cover 21 located in the advancing direction of the vehicle, a housing 22 located on the opposite side of the translucent cover 21, and a lamp chamber 23 surrounded by the translucent cover 21 and the housing 22, and a headlight 24, a first sensor module 25, and a second sensor module 26, which are located inside the light chamber 23, respectively.

The headlight 24 includes optical components including at least one of a lens and a reflector. The light emitted from the headlight 24 passes through the translucent cover 21 and illuminates the front right of the vehicle. Since the lamp device 20 includes the headlight 24, it functions as a headlight.

Figure 2:
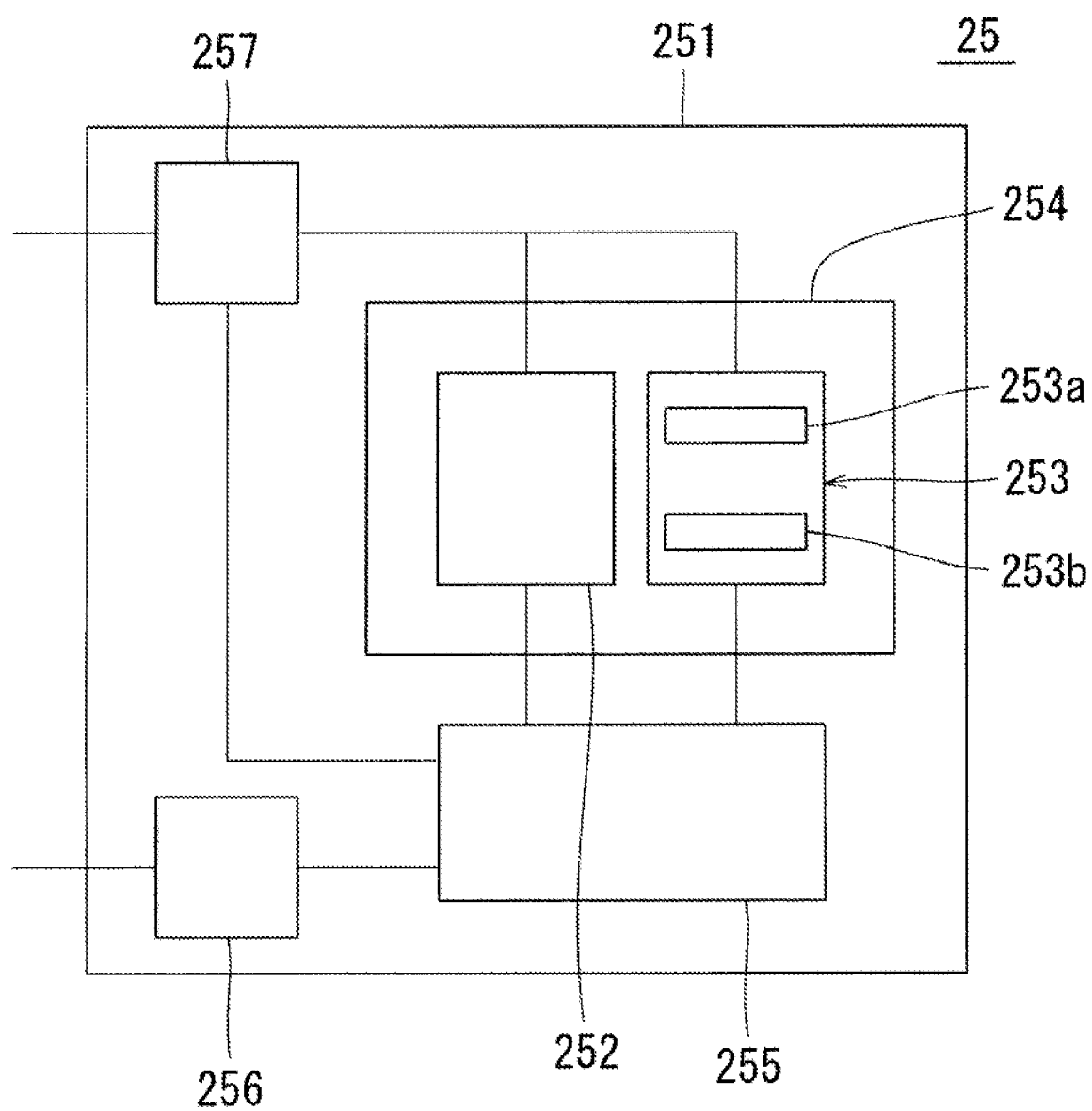
FIG. 2 is a schematic view showing a constitution of a first sensor module disposed in the lamp device shown in FIG. 1.

The first sensor module 25 includes a first substrate 251 (a support member). The first substrate 251 supports a first visible light camera 252, a first LiDAR (Light Detection and Ranging) sensor 253, and a first light shielding member 254 (a shielding member), and further supports a control part 255, a communication part 256 and a power supply part 257 as shown in FIG. 2. The first substrate 251 is a substrate on which a sensor circuit including the first visible light camera 252, the first LiDAR sensor 253, the control part 255, the communication part 256, and the power supply part 257 is mounted. That is, a plurality of sensors (the first visible light camera 252 and the first LiDAR sensor 253) having different detection methods, the first light shielding member 254 which is a cylindrical hollow member surrounding these sensors, and a circuit for operating these sensors are modularized on the first substrate 251.

As shown in FIG. 1, the first visible light camera 252 photographs the right side of the vehicle. That is, the first visible light camera 252 is a sensor that detects information on the right side of the vehicle.

As shown in FIG. 2, the first LiDAR sensor 253 includes a light emitting part 253a that emits infrared light and a light receiving part 253b that detects reflected light that the infrared light hits and is reflected by an object existing on the right side of the vehicle.

The first LiDAR sensor 253 can determine the distance to the object based on the time from emitting infrared light in a certain direction to detecting the reflected light from the object. In addition, information on the shape of the object can be obtained by accumulating and analyzing the measured value of the distance in association with the detection position. Moreover, information such as a material of the object associated with the reflection can be obtained based on the difference in the wavelength between the emitted light and the reflected light. Furthermore, information on the color of the object (such as a white line on a road surface) can be obtained based on the difference in the reflectance of the reflected light. That is, the first LiDAR sensor 253 can obtain various information on the right side of the vehicle by a method different from that of the first visible light camera 252.

As shown in FIG. 1, the first sensor module 25 includes a first actuator 258 (an example of an adjustment mechanism) connected to the first substrate 251. The first actuator 258 adjusts at least one of the position and the posture of the first substrate 251 with respect to the vehicle.

Further, the second sensor module 26 includes a second substrate 261. The second substrate 261 supports a second visible light camera 262, a second LiDAR sensor 263, a millimeter wave radar 264, and a second light shielding member 265 which is a cylindrical hollow member surrounding them, and further supports a control part, a communication part, and a power supply part, which are not shown.

Since the functions of the second visible light camera 262 and the second LiDAR sensor 263 are the same as the functions of the first visible light camera 252 and the first LiDAR sensor 253, the description thereof is omitted.

The millimeter wave radar 264 includes a transmitter that emits millimeter waves and a receiver that receives reflected waves in which the millimeter waves hit and are reflected by an object existing at least in the right front of the vehicle. The frequency of the millimeter wave is, for example, 24 GHz, 26 GHz, 76 GHz or 79 GHz.

The millimeter wave radar 264 can determine the distance to the object based on the time from emitting infrared light in a certain direction to detecting the reflected light from the object. In addition, information on the movement of the object can be obtained by accumulating and analyzing the measured value of the distance in association with the detection position. That is, the millimeter wave radar 264 can obtain information on the right front of the vehicle by a method different from that of the second visible light camera 262 or the second LiDAR sensor 263.

The second sensor module 26 includes a second actuator 266 (an example of an adjustment mechanism) connected to the second substrate 261. The second actuator 266 adjusts at least one of the position and the posture of the second substrate 261 with respect to the vehicle.

Further, the lamp device 20 includes a signal processing part 27 located outside the lamp chamber 23. The signal processing part 27 is configured to output a first driving signal 271 for driving the first actuator 258 and a second driving signal 272 for driving the second actuator 266. The first driving signal 271 includes information that adjusts at least one of the position and the posture of the first actuator 258, and the second driving signal 272 includes information that adjusts at least one of the position and the posture of the second actuator 266.

In the lamp device 20, at least one of the first light shielding member 254 of the first sensor module 25 and the second light shielding member 265 of the second sensor module 26 includes the light shielding member of the present embodiment described above. As described above, the light shielding member of the present embodiment has a high electrical resistance and a black color surface, so that light rays scattered around the first sensor module 25 or the second sensor module 26 can be blocked and highly accurate information can be obtained.

The lamp device 20 includes a light shielding member located around the headlight 24. In the lamp device 20, the light shielding member located around the headlight 24 includes the light shielding member of the present embodiment. In other words, the light shielding member of the present embodiment may be for a light source element of the headlight. According to such a constitution, stray light can be removed by the low reflectance of the light shielding member of the present embodiment, so that unnecessary reflection or scattering on the optical path can be reduced, and noises of the projected image can be reduced. Additionally, the UV absorption effect of the oxide of titanium can suppress deterioration due to sunlight, and the headlight 24 can be protected, so that it can be used for a long period of time.

The lamp device 20 includes a light shielding member attached to the first visible light camera 252 and a light shielding member attached to the second visible light camera 262. In the lamp device 20, at least one of the light shielding member attached to the first visible light camera 252 and the light shielding member attached to the second visible light camera 262 includes the light shielding member of the present embodiment. In other words, the light shielding member of the present embodiment may be for an in-vehicle camera. According to such a constitution, noises of the projected image can be reduced by the low reflectance of the light shielding member of the present embodiment in the visible light region and the (near) infrared region. Additionally, the photocatalytic effect of the oxide of titanium can prevent stains near the lens and maintain sensitivity.

(Head-Up Display)

Figure 3:
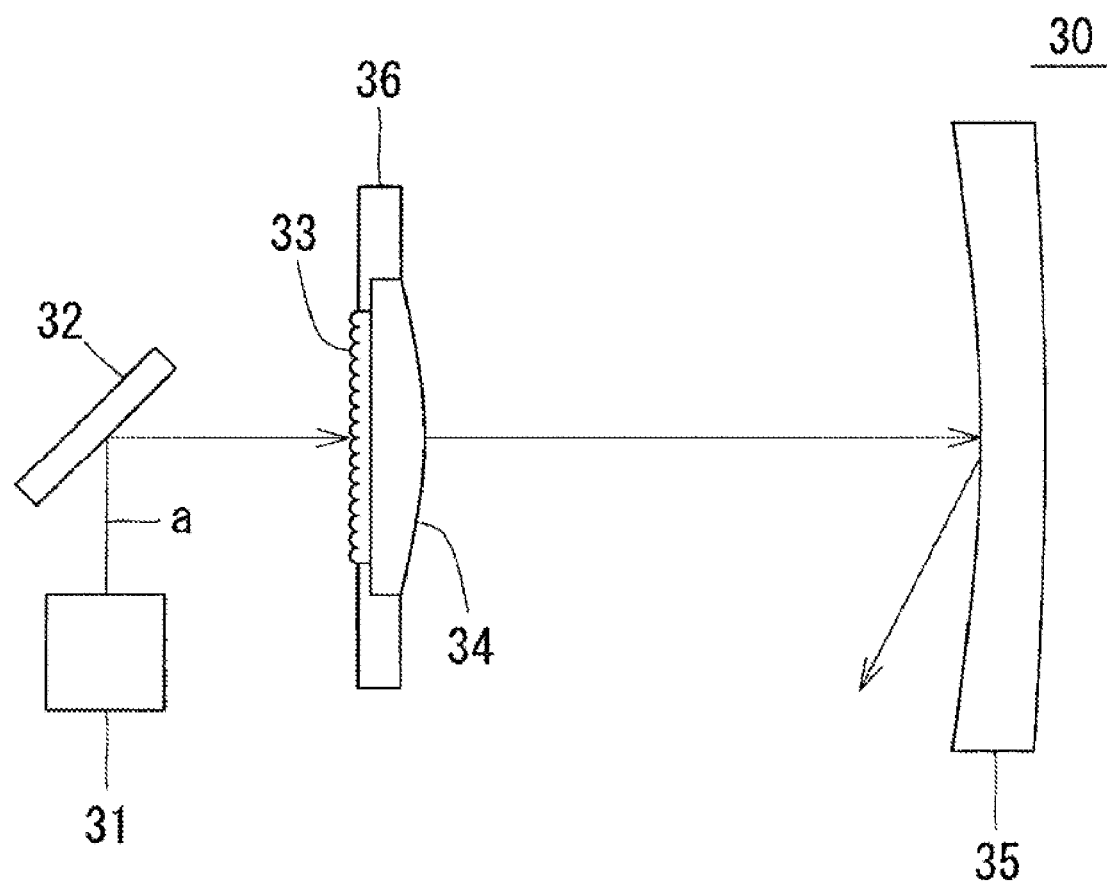
FIG. 3 is a schematic diagram of a head-up display including the light shielding member according to the embodiment of the present disclosure.

As shown in FIG. 3, the head-up display 30 according to the embodiment of the present disclosure includes a vehicle projector module 31, a reflection mirror 32, a microlens array 33, a convex lens 34, and a combiner 35, in order from the side the image is projected.

The vehicle projector module 31 projects an image in the direction of arrow a. Further, the vehicle projector module 31 includes an optical and MEMS (Micro Electro Mechanical Systems) unit and an RGB light source module housed in the optical and MEMS unit.

The reflection mirror 32 reflects the image projected from the vehicle projector module 31 toward the microlens array 33. The microlens array 33 functions as an intermediate image screen. The convex lens 34 is adjacent to the microlens array 33 and is convex toward the combiner 35, and it functions as a field lens. The combiner 35 reflects the image magnified by the convex lens 34 toward the driver's eyes.

Here, the head-up display 30 further includes the following constitution in addition to the above-described constitution. That is, the head-up display 30 includes a lens holding member 36 for holding the microlens array 33 and the convex lens 34 as a holding member of the optical product. Further, the head-up display 30 includes light shielding members that are attached to the reflection mirror 32 and the lens holding member 36, respectively.

In the head-up display 30, at least one of the light shielding member attached to the reflection mirror 32 and the light shielding member attached to the lens holding member 36 includes the light shielding member of the present embodiment. In other words, the light shielding member of the present embodiment may be for a head-up display. According to such a constitution, noises of the projected image can be reduced by the low reflectance of the light-shielding member of the present embodiment over a wide wavelength range. Additionally, an antifouling effect due to the photocatalytic effect of the oxide of titanium enables a long-term use.

<Radiation Thermometer>

Figure 4:
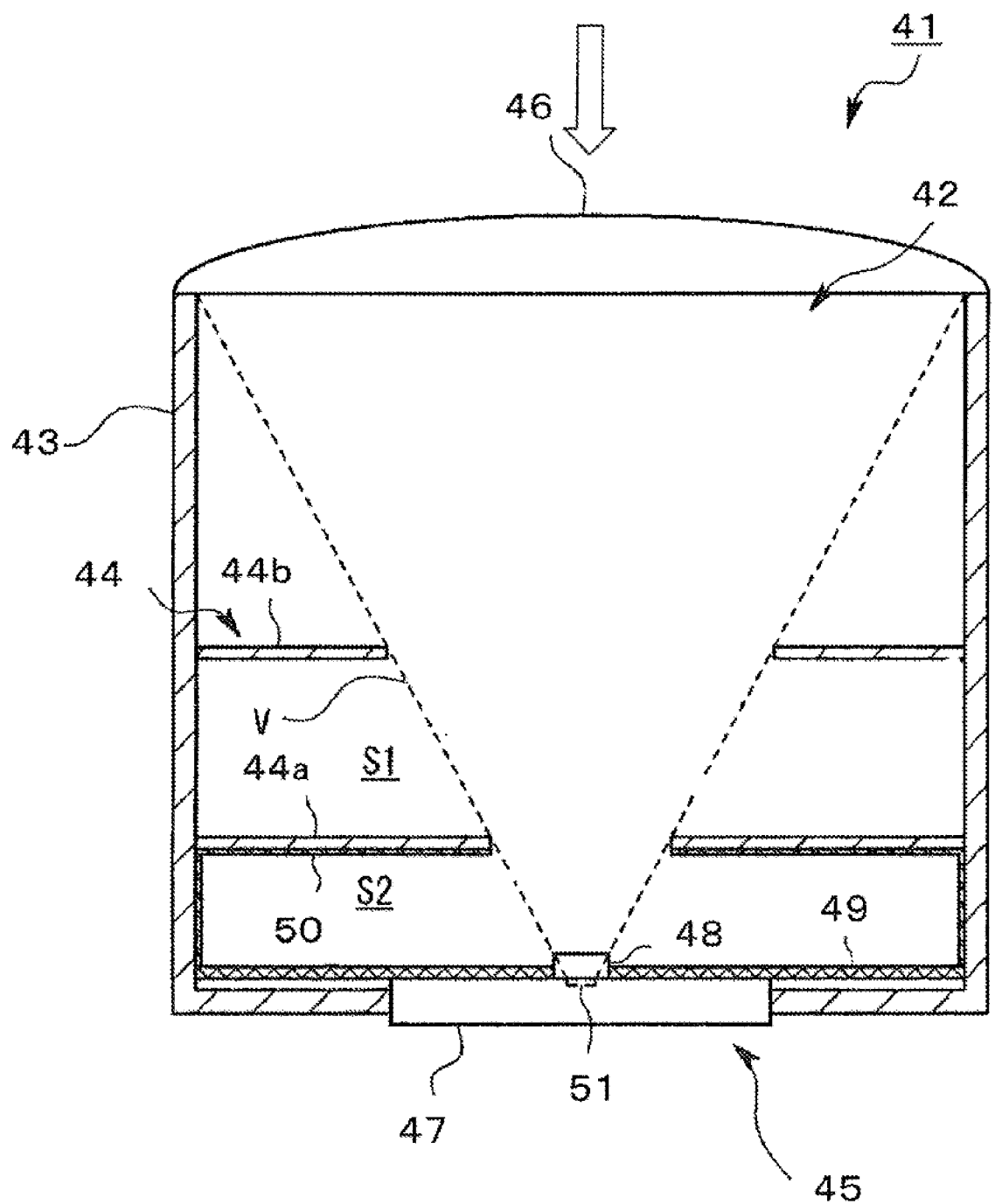
FIG. 4 is a schematic view showing a constitution of a radiation thermometer including the light shielding member according to the embodiment of the present disclosure.

The light shielding member of the present embodiment can also be used for a radiation thermometer. The radiation thermometer according to the embodiment of the present disclosure will be described with reference to the drawings. The radiation thermometer shown in FIG. 4 is a thermometer used on a site where the temperature of the environment is not constant, and a large temperature change occurs. The radiation thermometer can measure the temperature of an object to be measured in a non-contact manner based on the intensity of infrared rays emitted from the object to be measured.

The radiation thermometer shown in FIG. 4 includes an infrared detector 41 and a temperature calculation part (not shown) calculating the temperature of the object to be measured based on an electrical signal output from the infrared detector 41. The infrared detector 41 includes a lens barrel 43 made of metal including an infrared introduction port 42 on the tip end side, a diaphragm mechanism 44 formed in the lens barrel 43, and an infrared sensor 45 formed on the base end side of the lens barrel 43. The temperature calculation part TC is, for example, a computer including a CPU, a memory, an A/D and D/A converter and the like, and a program stored in the memory is executed. Specifically, the electrical signal output by the infrared sensor 45 according to the amount of infrared rays incident is input to the temperature calculation part TC, and the temperature calculation part TC converts the amount of infrared rays indicated by the electrical signal into a temperature by a predetermined conversion formula and outputs the value.

The lens barrel 43 has a cylindrical shape, its tip end side opens to form an infrared introduction port 42, and its base end side is closed except for a part to which the infrared sensor 45 is attached. Furthermore, a convex lens 46 is attached so as to close the infrared introduction port 42.

The diaphragm mechanism 44 includes a first diaphragm 44a formed on the base end side of the lens barrel 43 and a second diaphragm 44b formed on the tip end side of the lens barrel 43. The first diaphragm 44a and the second diaphragm 44b are formed perpendicular to the axial direction of the lens barrel 43, and the first diaphragm 44a has an opening diameter smaller than the second diaphragm 44b. That is, the first diaphragm 44a limits a visual field V of the infrared sensor 45, and determines the size of the visual field V, which is a range in which infrared rays emitted from the object to be measured can enter through the lens 46. By arranging the first diaphragm 44a and the second diaphragm 44b side by side in the axial direction of the lens barrel 43, the stray light in the lens barrel 43 is set to enter the infrared sensor 45.

In the following description, as to the internal space of the lens barrel 43, the space closer to the tip end side than the first diaphragm 44a is referred to as an introduction port side space S1, and the space closer to the base end side than the first diaphragm 44a is referred to as a sensor side space S2.

The infrared sensor 45 includes a sensor element 51 housed in a casing 47 in a cylindrical shape and an optical filter 48 formed on the top surface of the casing 47, and it is formed on the base end side of the lens barrel 43 so as the light receiving surface of the sensor element 51 is arranged to locate on the axis and face the infrared introduction port 42.

The sensor element 51 is a thermal-type element that detects temperature changes when infrared rays are absorbed as a change in electromotive force, and here, a thermopile element in which a plurality of thermocouples are arranged in series to form a thin film is used.

The optical filter 48 is a bandpass filter that allows light (electromagnetic waves) in a predetermined wavelength band only to pass through. Here, for example, one that allows infrared rays in the band having a wavelength of 8 μm to 14 μm only to pass through is used, and only the infrared rays that have passed through the optical filter 48 are received by the sensor element 51. Since this wavelength band (8 μm to 14 μm) is a band having little absorption by the atmosphere, if measuring the temperature, the influence of absorption by the atmosphere intervening between the object to be measured and the infrared sensor 45 is suppressed, and a highly accurate measurement can be performed.

Further, a reflection structure 49 or an infrared absorption structure 50 is formed on the surface forming the sensor side space S2 in the lens barrel 43.

The reflection structure 49 is formed on the inner peripheral surface of the lens barrel 43 in contact with the sensor side space S2 and on the surface facing the infrared sensor 45 among the partition plates forming the first diaphragm 44a.

The reflection structure 49 is a reflection film formed of a resin and the like including a metal filler, and the amount of incident infrared rays reflected can be larger than the amount absorbed.

The infrared absorption structure 50 is a light shielding member of the present disclosure in a plate shape which is laid so as to cover the entire top surface of the infrared sensor 45 except the optical filter 48 and the entire internal end surface on the base end side of the lens barrel 43. That is, the infrared absorption structure 50 is formed on all the portions facing the first diaphragm 44a except for the optical filter 48. The amount of infrared rays incident on the infrared absorbing structure 50 can be absorbed more than the amount reflected.

If the radiation thermometer is set in an environment where the temperature changes significantly, the temperature of the infrared detector itself that constitutes the radiation thermometer fluctuates greatly, so the intensity of infrared rays emitted from the inner surface on the tip end side of the lens barrel 43 becomes difficult to keep constant. If such infrared rays whose intensity changes are incident on the infrared sensor 45, the measurement temperature tends to drift.

Even if the infrared rays that cause such measurement temperature drift pass through the first diaphragm 44a, if there is a light shielding member, the infrared rays are incident on and absorbed by the light shielding member, so that the measurement temperature is less likely to drift.

Although the embodiments according to the present disclosure have been illustrated above, it is needless to say that the present disclosure is not limited to the above-described embodiments and can be arbitrary as long as it does not depart from the gist of the present disclosure.

For example, in the above-described embodiments, the case where the light shielding member is for an in-vehicle optical device and a radiation thermometer has been described as an example, but the light shielding member of the present embodiment is not limited to for the in-vehicle optical device and the radiation thermometer, and it can be used for other purposes as well. Other usages include, for example, electronic devices, medical, physical and chemical equipments, and the like. Specific examples include medical equipments such as a CT scan and analyzing apparatus such as a transmission electron microscope (TEMs). The usages of the light shielding member are not limited to the examples.

Hereinafter, the present disclosure will be described in detail with reference to examples, but the present disclosure is not limited to the following examples.

EXAMPLES

First, each powder of aluminum oxide, silicon oxide, calcium carbonate, magnesium hydroxide and titanium oxide was prepared.

The contents of each powder of aluminum oxide, silicon oxide, calcium carbonate, magnesium hydroxide and titanium oxide were adjusted so that the components constituting the sintered body, which is the light shielding member, had the values shown in Table 1.

Then, these powders were wet-mixed with a barrel mill and ground to obtain a slurry. In the grinding, a solvent, 1.25 parts by mass of polyvinyl alcohol (PVA) with respect to 100 parts by mass of the solvent, and 0.3 parts by mass of dispersant with respect to 100 parts by mass of the solvent were also put into the mill. Next, the obtained slurry was demagnetized to adjust the total content of Fe, Ni, Co, Mn, and Cr in the light shielding member to the values shown in Table 1, and then spray-dried to obtain granules. The stainless steel members used in the grinder were coated with a TiN film in advance, and then the powder was ground.

Then, the granules were molded by the cold isotropic pressure method (CIP) and then performed a cutting process to obtain a molded body. Then, the obtained molded body was held in an air (oxidizing) atmosphere at a temperature of 1570° C. for 2 hours and a sintered body was obtained. Next, the surface of the sintered body was polished by using a vibrating barrel grinder.

Then, the sintered body obtained by the above-mentioned method was held in a reducing atmosphere (a mixed gas having a nitrogen:hydrogen ratio of 88.5% by volume: 11.5% by volume) at a temperature of 1350° C. for 1 hour and 30 minutes, and samples Nos. 1 to 4 were obtained.

Each of the obtained samples was identified by using XRD. The value of x in $TiO_{2-x}$ was determined by using a transmission electron microscope (TEM). Additionally, the content of the elements constituting each sample was determined by using XRF and converted to the identified components. Furthermore, the content of Fe, Ni, Co, Mn and Cr, which are trace components, was determined by using a glow discharge mass spectrometer (GDMS). These results are shown in Table 1. Each sample includes unavoidable impurities as components not shown in Table 1.

Figure 5:
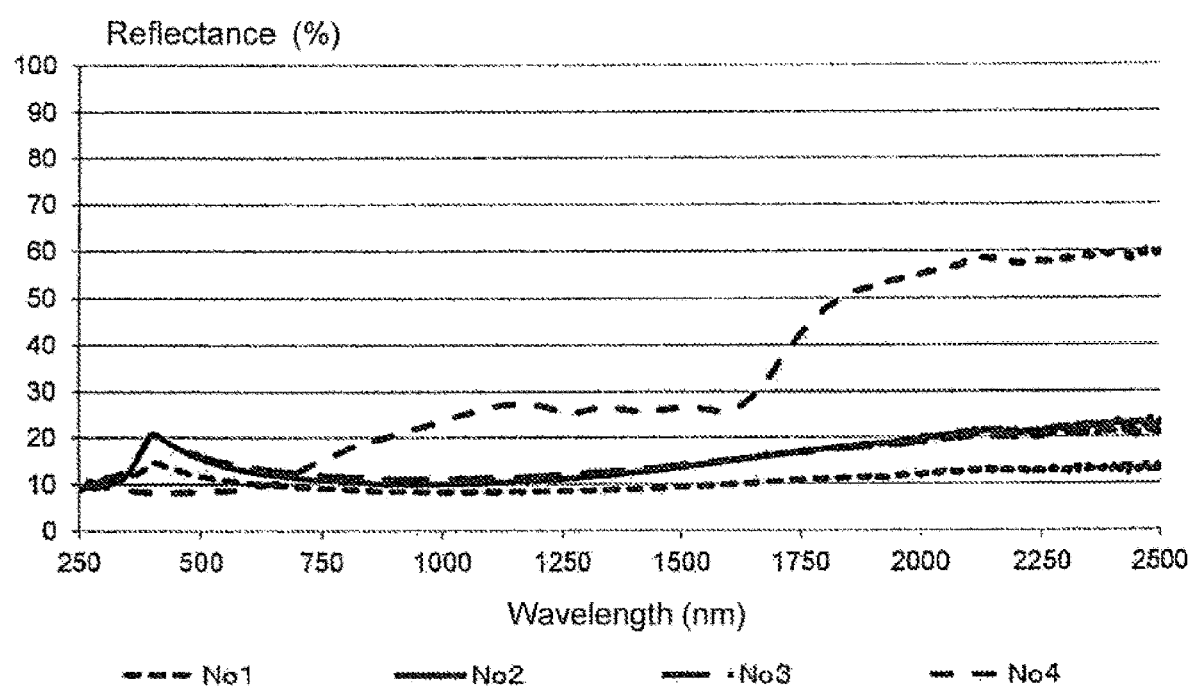
FIG. 5 is a graph showing measurement results of reflectance in Examples.

For each sample, the reflectance in the wavelength range of 250 nm to 2500 nm was determined by using a UV- Visible/NIR spectrophotometer (V-670, manufactured by JASCO Corporation), and the measured values were shown in FIG. 5 as a graph. ΔR was calculated from the minimum value Rmin and the maximum value Rmax of the reflectance in the above region of each sample. The minimum value Rmin, the maximum value Rmax and ΔR of the reflectance are shown in Table 1.

The integrating sphere unit used for measuring the reflectance was ISN-723, the reference light source was a deuterium lamp for the wavelength range of 250 nm to 360 nm, and a halogen lamp for the wavelength range of 360 nm to 2500 nm, and as the measurement conditions, the measurement mode was total reflectance, the data acquisition interval was 1.0 nm, the UV/Vis bandwidth was 5.0 nm, and the NIR bandwidth was 20.0 nm.

TABLE 1

| Samples Nos. | $Al_2O_3$ (% by mass) | $SiO_2$ (% by mass) | CaO (% by mass) | MgO (% by mass) | $TiO_{2-x}$ (% by mass) | x | $MnO_2$ (% by mass) | Total content of Fe, Ni, Co, Mn and Cr (Mass ppm) | Rmin (%) | Rmax (%) | ΔR (%) |
|---|---|---|---|---|---|---|---|---|---|---|---|
| 1 | 95.3 | 1.6 | 0.8 | 0.5 | 1.7 | 0.5 | — | 88 | 8.38 | 14.56 | 6.18 |
| 2 | 94.4 | 3 | 0.4 | 0.5 | 1.5 | 0.5 | — | 173 | 8.72 | 23.99 | 15.27 |
| 3 | 94.4 | 3 | 0.4 | 0.5 | 1.5 | 0.6 | — | 250 | 8.76 | 22.44 | 13.68 |
| 4 | 89.8 | 1.7 | 0.1 | — | 1.9 | 0.5 | 3.6 | 36800 | 8.25 | 60.33 | 62.05 |

As shown in Table 1 and FIG. 5, the values of Rmax and ΔR in Samples Nos. 1 to 3 were smaller than those in Sample No. 4. From this result, it was found that if it was composed of aluminum oxide ceramics including the oxide of titanium whose composition formula was represented by $TiO_{2-x}$ ($1 \leq x < 2$), and the total content of Fe, Ni, Co, Mn and Cr was 260 mass ppm or less, the reflectance was low in the wavelength range of 250 nm to 2500 nm, and the variation of the wavelength distribution of the light intensity of the reflected light with respect to the irradiated light was small.

In particular, Sample No. 1 is more suitable for the above-mentioned use because the difference ΔR of the reflectance in the above region is 6.2%.

For each sample, the volume resistivity at a room temperature (20° C.) was determined in accordance with JIS C 2141:1992. The measurement results are as follows.

Sample No. 1: $10^{11}$ Ω·m
Sample No. 2: $10^{12}$ Ω·m
Sample No. 3: $10^{12}$ Ω·m
Sample No. 4: $10^{10}$ Ω·m The total of the components shown in Table 1 for each sample is not 100% by mass, but the components other than the components shown in Table 1 are unavoidable impurities.

EXPLANATION OF SYMBOLS

20: lamp device
21: translucent cover
22: housing
23: lamp chamber
24: headlight
25: first sensor module
251: first substrate
252: first visible light camera
253: first LiDAR sensor
253a: light emitting part
253b: light receiving part
254: first light shielding member
255: control part
256: communication part
257: power supply part
258: first actuator
26: second sensor module
261: second substrate
262: second visible light camera
263: second LiDAR sensor
264: millimeter wave radar
265: second light shielding member
266: second actuator
27: signal processing part
271: first driving signal
272: second driving signal
30: head-up display
31: vehicle projector module
32: reflection mirror
33: microlens array
34: convex lens
35: combiner
36: lens holding member
41: infrared detector
42: infrared introduction port
43: lens barrel
44: diaphragm mechanism
45: infrared sensor
46: lens
47: casing
48: optical filter
49: reflection structure
50: infrared absorption structure
51: sensor element

The invention claimed is:

1. A light shielding member, disposed around an optical element to block unnecessary light and comprising an aluminum oxide ceramics comprising an oxide of titanium whose composition formula is shown as $TiO_{2-x}$ ($1 \leq x < 2$), wherein
a total content of Fe, Ni, Co, Mn and Cr is 86 mass ppm or more and 260 mass ppm or less,
$TiO_{2-x}$ is 1.5% by mass or more and 1.7% by mass or less,
a maximum value Rmax of a reflectance of a region in a wavelength of 250 nm to 2500 nm is 14.56% or more and 22.44% or less, and
a difference ΔR between the maximum value Rmax and a minimum value Rmin of the reflectance of the region in the wavelength of 250 nm to 2500 nm is 6.18% or more and 13.68% or less.

2. The light shielding member according to claim 1, which is for an in-vehicle optical device.

3. The light shielding member according claim 1, which is for a radiation thermometer.

* * * * *